US012281584B2

(12) United States Patent
Bouldin et al.

(10) Patent No.: US 12,281,584 B2
(45) Date of Patent: Apr. 22, 2025

(54) PHONIC WHEEL FOR TURBINE ENGINE

(71) Applicant: Raytheon Technologies Corporation, Farmington, CT (US)

(72) Inventors: Allison L. Bouldin, Tolland, CT (US); Joseph B. Phelps, Rocky Hill, CT (US)

(73) Assignee: RTX Corporation, Farmington, CT (US)

( * ) Notice: Subject to any disclaimer, the term of this patent is extended or adjusted under 35 U.S.C. 154(b) by 46 days.

(21) Appl. No.: 18/202,750

(22) Filed: May 26, 2023

(65) Prior Publication Data

US 2024/0392693 A1    Nov. 28, 2024

(51) Int. Cl.
| | | |
|---|---|---|
| *F01D 17/06* | (2006.01) | |
| *F02C 7/06* | (2006.01) | |
| *G01P 3/487* | (2006.01) | |
| *G01P 3/488* | (2006.01) | |

(52) U.S. Cl.
CPC ............... *F01D 17/06* (2013.01); *F02C 7/06* (2013.01); *G01P 3/487* (2013.01); *G01P 3/488* (2013.01); *F05D 2220/32* (2013.01); *F05D 2250/182* (2013.01); *F05D 2260/80* (2013.01); *F05D 2260/98* (2013.01); *F05D 2270/809* (2013.01); *F05D 2300/507* (2013.01)

(58) Field of Classification Search
CPC .... G01P 3/487; G01P 3/488; F05D 2270/809; F05D 2250/182; F01D 17/06
See application file for complete search history.

(56) References Cited

U.S. PATENT DOCUMENTS

| | | | |
|---|---|---|---|
| 3,626,226 A | 12/1971 | Pauwels | |
| 3,949,841 A * | 4/1976 | Jovick | B60T 8/329 |
| | | | 310/168 |
| 4,940,937 A * | 7/1990 | Hattori | G01P 3/443 |
| | | | 310/155 |
| 5,166,611 A * | 11/1992 | Kujawa, Jr. | F16C 41/007 |
| | | | 29/520 |

(Continued)

FOREIGN PATENT DOCUMENTS

| | | |
|---|---|---|
| CN | 102607751 B | 6/2014 |
| DE | 4041399 A1 * | 6/1992 |

(Continued)

OTHER PUBLICATIONS

EP Search Report for EP Patent Application No. 24166498.6 dated Jun. 6, 2024.

*Primary Examiner* — Topaz L. Elliott
(74) *Attorney, Agent, or Firm* — Getz Balich LLC

(57) ABSTRACT

An assembly is provided for a turbine engine. This turbine engine assembly includes a rotating assembly configured to rotate about an axis. The rotating assembly includes an engine component and a phonic wheel. The engine component includes a first material and a plurality of apertures arranged circumferentially about the axis. The phonic wheel includes a second material and a plurality of teeth arranged circumferentially about the axis. Each of the teeth projects axially into a respective one of the apertures. One of the first material and the second material is or otherwise includes non-ferromagnetic material. Another one of the first material and the second material is or otherwise includes ferromagnetic material.

16 Claims, 8 Drawing Sheets

(56) References Cited

U.S. PATENT DOCUMENTS

| | | | | |
|---|---|---|---|---|
| 5,332,065 | A * | 7/1994 | Steele | G01P 1/00 |
| | | | | 188/18 R |
| 5,551,291 | A * | 9/1996 | Morita | G01P 3/487 |
| | | | | 73/514.39 |
| 6,642,709 | B2 * | 11/2003 | Heimann, Jr. | G01P 3/443 |
| | | | | 324/207.22 |
| 8,148,974 | B2 * | 4/2012 | Brokelmann | G01P 3/488 |
| | | | | 324/179 |
| 9,316,231 | B2 | 4/2016 | Simms | |
| 9,708,926 | B2 | 7/2017 | Curlier | |
| 10,168,236 | B2 | 1/2019 | Curlier | |
| 10,174,629 | B1 | 1/2019 | Valva | |
| 10,495,163 | B2 * | 12/2019 | White | F16D 65/123 |
| 12,078,073 | B1 * | 9/2024 | Phelps | F01D 25/18 |
| 12,123,311 | B1 * | 10/2024 | Shockey | F01D 25/18 |
| 2003/0122539 | A1 * | 7/2003 | Heimann, Jr. | G01P 3/488 |
| | | | | 324/207.22 |
| 2015/0211380 | A1 * | 7/2015 | Curlier | F01D 1/18 |
| | | | | 415/118 |
| 2017/0115320 | A1 | 4/2017 | Turner | |
| 2020/0200036 | A1 | 6/2020 | Petersen | |
| 2020/0200788 | A1 | 6/2020 | Davies | |
| 2023/0059943 | A1 * | 2/2023 | Quintin | F02C 7/06 |
| 2024/0011412 | A1 * | 1/2024 | Tousignant | G01P 3/488 |
| 2024/0053213 | A1 * | 2/2024 | Fulleringer | G01L 3/104 |
| 2024/0392694 | A1 * | 11/2024 | Phelps | G01P 3/443 |

FOREIGN PATENT DOCUMENTS

| | | | | |
|---|---|---|---|---|
| DE | 102013210661 | A1 * | 12/2014 | F16D 13/70 |
| DE | 102022133249 | B3 * | 4/2024 | |

* cited by examiner

PHONIC WHEEL FOR TURBINE ENGINE

GOVERNMENT LICENSE RIGHTS

This invention was made with Government support. The Government has certain rights in this invention.

BACKGROUND OF THE DISCLOSURE

1. Technical Field

This disclosure relates generally to a turbine engine and, more particularly, to a sensor system for the turbine engine.

2. Background Information

A gas turbine engine may include a sensor system configured to measure a rotational velocity of a rotating element such as an engine shaft. Various type of sensor systems are known in the art, including those which utilize a phonic wheel to induce fluctuations in a magnetic field. While these known sensor systems have various benefits, there is still room in the art for improvement.

SUMMARY OF THE DISCLOSURE

According to an aspect of the present disclosure, an assembly is provided for a turbine engine. This turbine engine assembly includes a rotating assembly configured to rotate about an axis. The rotating assembly includes an engine component and a phonic wheel. The engine component includes a first material and a plurality of apertures arranged circumferentially about the axis. The phonic wheel includes a second material and a plurality of teeth arranged circumferentially about the axis. Each of the teeth projects axially into a respective one of the apertures. One of the first material and the second material is or otherwise includes non-ferromagnetic material. Another one of the first material and the second material is or otherwise includes ferromagnetic material.

According to another aspect of the present disclosure, another assembly is provided for a turbine engine. This turbine engine assembly includes a rotating assembly configured to rotate about an axis. The rotating assembly includes an engine component and a phonic wheel. The engine component includes a component outer surface and a plurality of apertures arranged circumferentially about the axis. Each of the apertures projects radially into the engine component from the component outer surface. A first of the apertures has a lateral aperture width. The phonic wheel includes a plurality of teeth arranged circumferentially about the axis. Each of the teeth projects axially into a respective one of the apertures. An outer surface of each of the teeth is radially flush with the component outer surface. A first of the teeth has a lateral tooth width which is within ten percent of the lateral aperture width.

According to still another aspect of the present disclosure, another assembly is provided for a turbine engine. This turbine engine assembly includes a rotating assembly and a sensor. The rotating assembly is configured to rotate about an axis. The rotating assembly includes an engine component and a phonic wheel. The engine component includes non-ferromagnetic material and a plurality of component teeth arranged circumferentially about the axis. The phonic wheel includes ferromagnetic material and a plurality of wheel teeth arranged circumferentially about the axis. The wheel teeth are meshed with the component teeth. A sensor is configured to measure fluctuations in a magnetic field induced by the wheel teeth during rotation of the rotating assembly about the axis.

The first material may be or otherwise include the non-ferromagnetic material. The second material may be or otherwise include the ferromagnetic material.

The first material may be or otherwise include the ferromagnetic material. The second material may be or otherwise include the non-ferromagnetic material.

The turbine engine assembly may also include a sensor configured to measure fluctuations in a magnetic field induced by the phonic wheel during rotation of the rotating assembly about the axis.

The teeth may be formed from ferromagnetic material. Portions of the engine component circumferentially interspersed with the teeth may be formed from non-ferromagnetic material.

The turbine engine assembly may also include a sensor configured to measure fluctuations in a magnetic field induced by the plurality of teeth during rotation of the rotating assembly about the axis.

The turbine engine assembly may also include a sensor system which includes the phonic wheel and the sensor. The sensor system may be configured to determine a rotational velocity of the rotating assembly.

A tip of the sensor may be disposed radially outboard of and adjacent the teeth.

The phonic wheel may be mounted on the engine component.

The engine component may be configured as an engine shaft.

The phonic wheel may also include a base. Each of the teeth may project axially out from a first side of the base. The first side of the base may axially engage the engine component.

The apertures may include a first aperture with a lateral aperture width. The teeth may include a first tooth with a lateral tooth width. The lateral tooth width may be within ten percent of the lateral aperture width.

The teeth may include a first tooth with a lateral tooth width. The first tooth may be laterally separated from the engine component by a gap with a lateral gap width less than ten percent of the lateral tooth width.

The teeth may include a first tooth with an axial tooth length. The first tooth may be axially separated from the engine component by a gap with an axial gap width less than ten percent of the axial tooth length.

Each of the teeth may have a lateral width. Each circumferentially neighboring pair of the teeth may be spaced apart by a lateral distance that is equal to or greater than the lateral width.

The engine component may also include a component outer surface. Each of the apertures may project radially into the engine component from the component outer surface. The teeth may include a first tooth with a tooth outer surface which is radially flush with the component outer surface.

The rotating assembly may also include a lubricant scoop radially outboard of and axially overlapping the component outer surface. A lubricant collection area may be formed by and radially between the engine component and the lubricant scoop.

The rotating assembly may also include a lubricant scoop. The lubricant scoop may be radially outboard of and axially overlap the engine component. The lubricant scoop may be axially adjacent the phonic wheel. A lubricant collection area may be formed by and radially between the engine component and the lubricant scoop.

The turbine engine assembly may also include a bearing rotatably supporting the rotating assembly.

The rotating assembly may also include a bladed rotor connected to the engine component.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
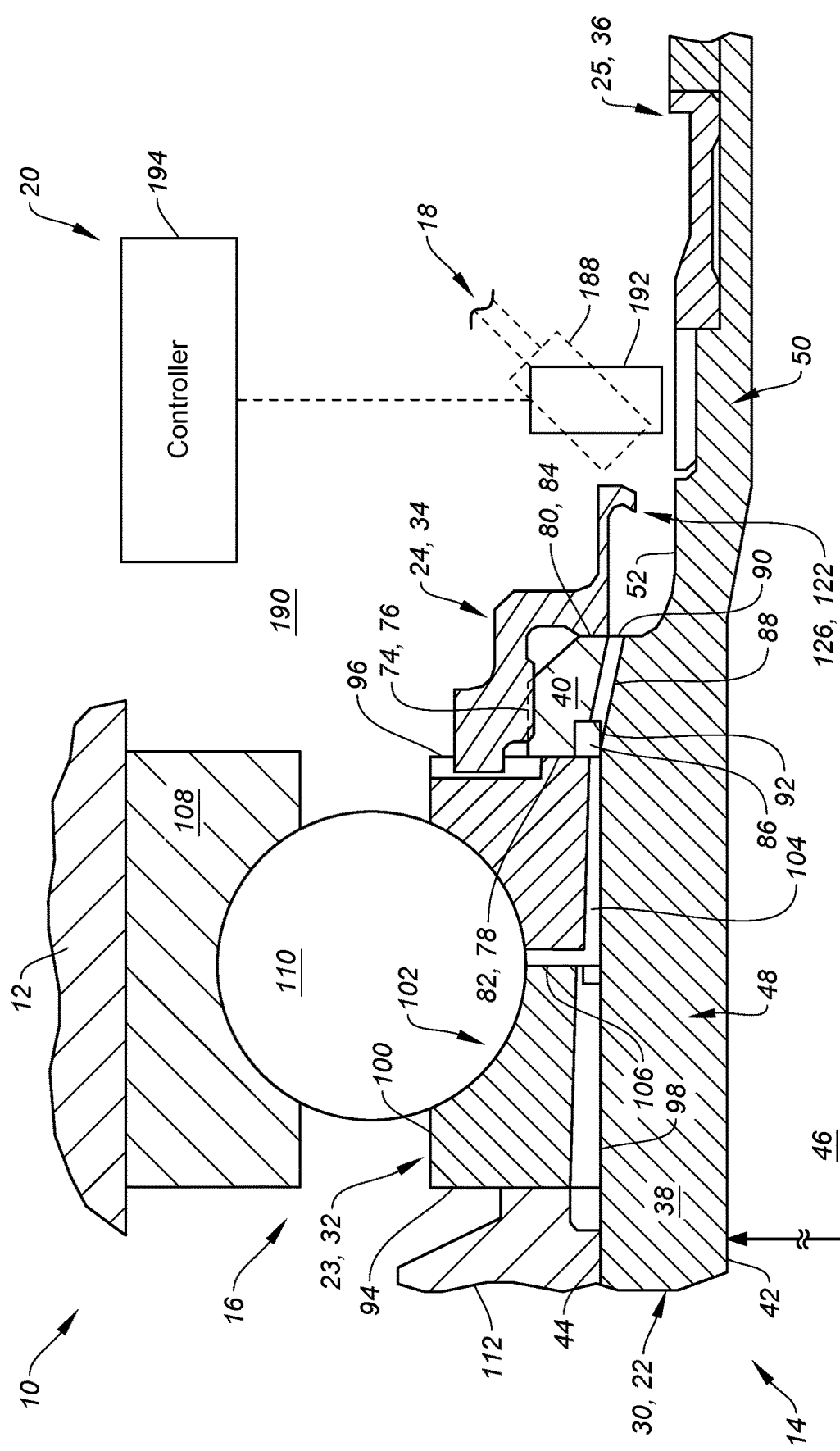
FIG. 1 is a partial side sectional illustration of an assembly for a turbine engine.

FIG. 1 is a partial side sectional illustration of an assembly 10 for a turbine engine. This engine assembly 10 includes a stationary structure 12, a rotating assembly 14 and a bearing 16 rotatably mounting the rotating assembly 14 to the stationary structure 12. The engine assembly 10 also includes a lubrication system 18 and a sensor system 20.

The rotating assembly 14 of FIG. 1 includes a plurality of engine components 22-25 arranged along an axis 28, which axis 28 may be an axial centerline and/or a rotational axis of the rotating assembly 14 and its engine components 22-25. The first engine component 22 is configured as or otherwise includes an engine shaft 30. Here, the other engine components 23-25 are mounted onto (e.g., fixedly secured to) and rotatable with the engine shaft 30. The second engine component 23 is configured as or otherwise includes an inner race 32 of the bearing 16. The third engine component 24 is configured as or otherwise includes a lubricant scoop body 34; e.g., a lubricant scoop nut. The fourth engine component 25 is configured as or otherwise includes a phonic wheel 36. The present disclosure, however, is not limited to the foregoing exemplary arrangement of engine components.

The engine shaft 30 includes a shaft base 38 and a shaft shoulder 40. The engine shaft 30 and its shaft base 38 extend axially along the axis 28. The shaft base 38 extends radially from a radial inner side 42 of the engine shaft 30 and its shaft base 38 to a radial outer side 44 of the shaft base 38. The shaft base 38 extends circumferentially about (e.g., completely around) the axis 28. The engine shaft 30 and its shaft base 38 may thereby have a full-hoop (e.g., tubular) geometry. Moreover, the shaft base 38 forms an inner bore 46 in the engine shaft 30. This inner bore 46 extends axially within, into or through the engine shaft 30 and its shaft base 38 along the shaft inner side 42.

Figure 2:
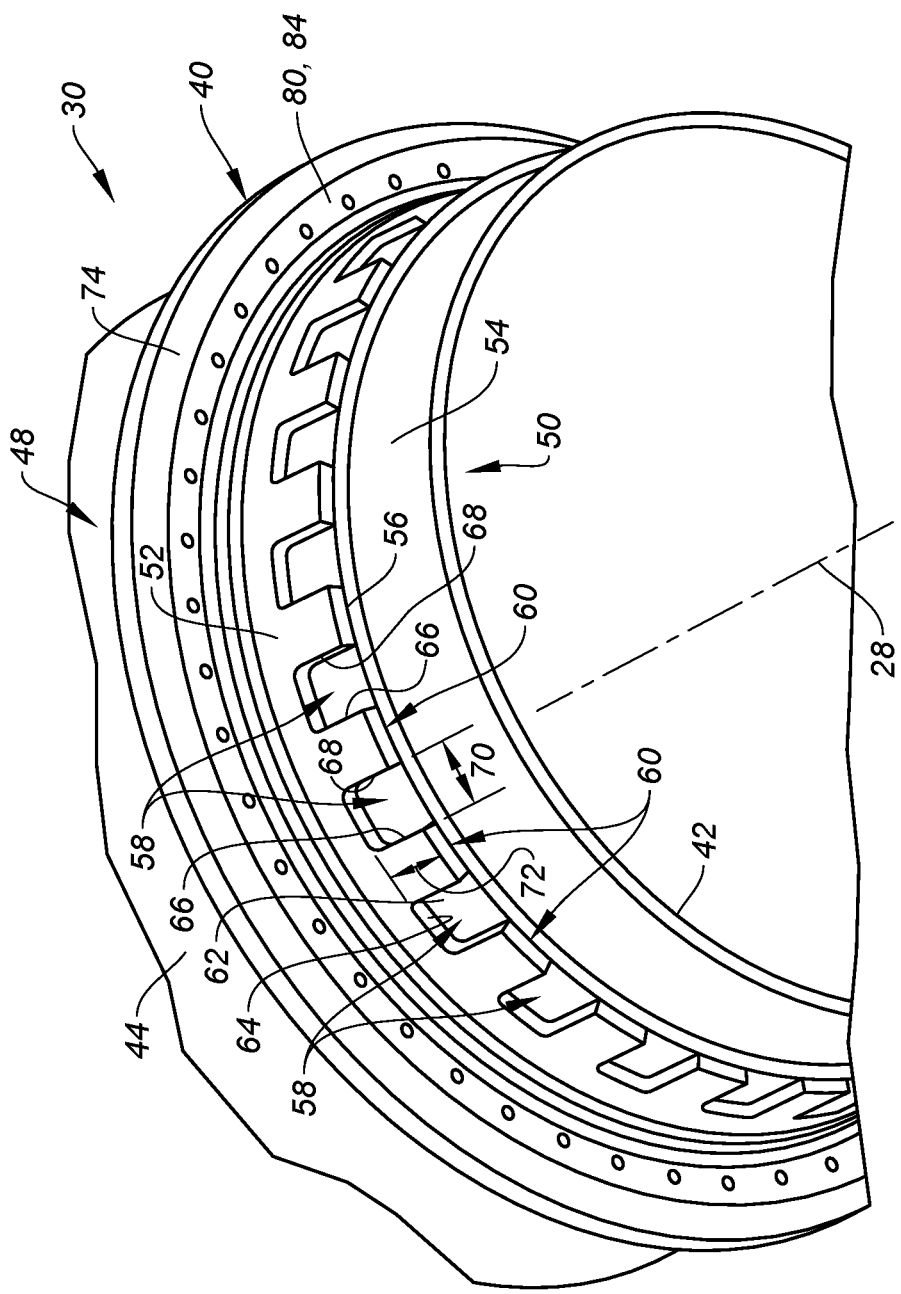
FIG. 2 is a partial perspective illustration of an engine shaft.

The shaft base 38 of FIG. 1 includes a radial outer section 48 and a radial inner section 50. The shaft outer section 48 is stepped radially outward from the shaft inner section 50. Referring to FIG. 2, the shaft inner section 50 includes an exterior outer surface 52, an exterior inner surface 54 and a shelf 56. The shaft inner section 50 of FIG. 2 also includes a plurality of apertures 58 (e.g., slots, grooves, indentations, etc.) and a plurality of teeth 60 (e.g., castellations, protrusions, etc.).

Figure 3:
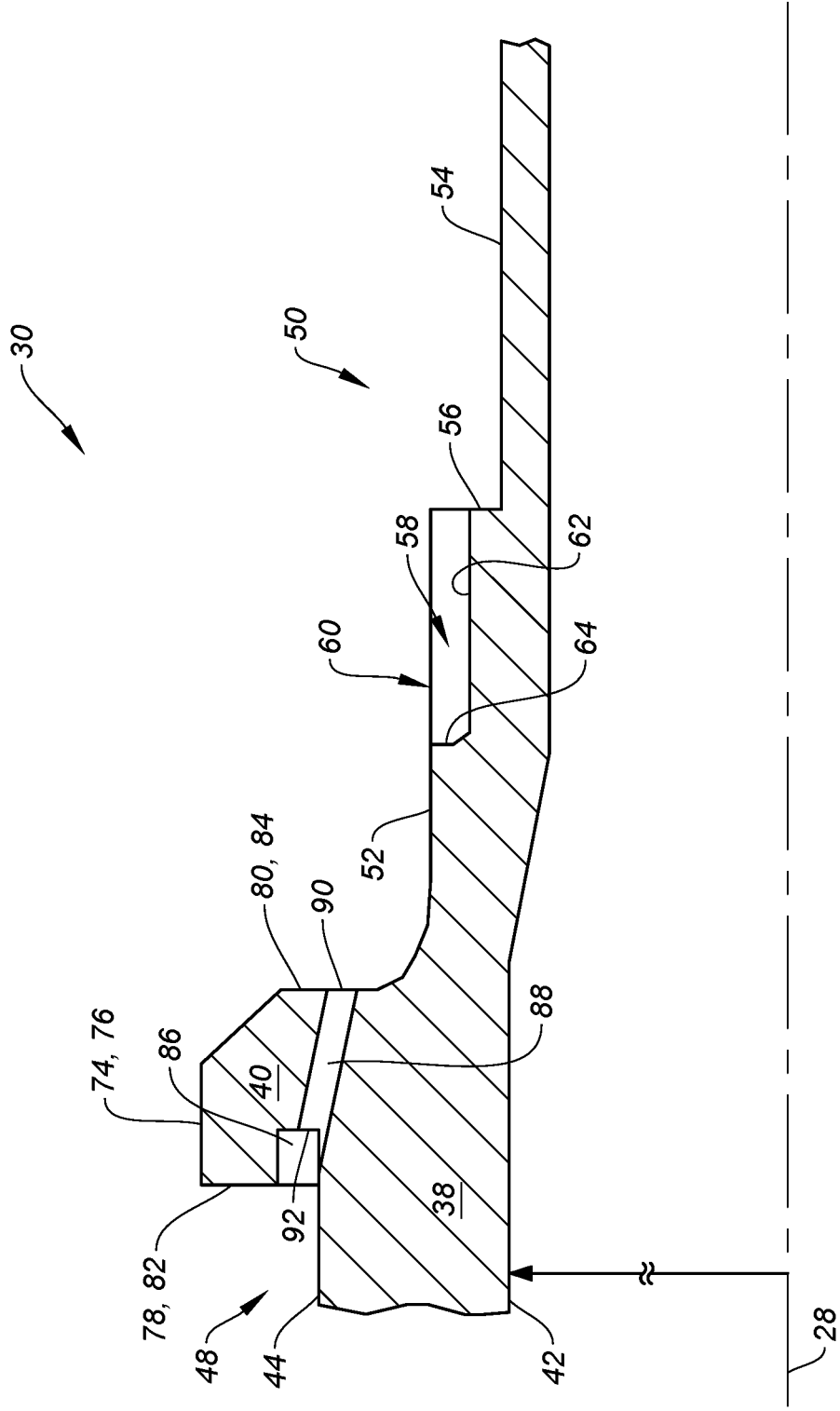
FIG. 3 is a partial side sectional illustration of the engine shaft.

Referring to FIG. 3, the shaft outer surface 52 is a radial outward facing surface at the base outer side 44 along the shaft inner section 50. This shaft outer surface 52 extends axially along the axis 28 from the shaft shoulder 40 to the shaft shelf 56. The shaft outer surface 52 extends circumferentially about (e.g., completely around) the axis 28; see also FIG. 2. The shaft outer surface 52 may thereby have a full-hoop geometry. The shaft outer surface 52 of FIG. 3, for example, is configured as a (e.g., partially castellated) cylindrical surface.

The shaft inner surface 54 is a radial outward facing surface at (or about) the base outer side 44 along the shaft inner section 50. This shaft inner surface 54 is radially recessed inward towards the axis 28 from the shaft outer surface 52. The shaft inner surface 54 extends axially along the axis 28 to the shaft shelf 56. The shaft inner surface 54 extends circumferentially about (e.g., completely around) the axis 28; see also FIG. 2. The shaft inner surface 54 may thereby have a full-hoop geometry. The shaft inner surface 54 of FIG. 3, for example, is configured as a cylindrical surface.

The shaft shelf 56 extends radially out from the shaft inner surface 54 to the shaft outer surface 52. This shaft shelf 56 may be a (e.g., partially castellated) annular surface which lies in a plane perpendicular to the axis 28.

Referring to FIG. 2, the shaft apertures 58 are arranged circumferentially about the axis 28 in an array; e.g., a circular array. The shaft teeth 60 are similarly arranged circumferentially about the axis 28 in an array; e.g., a circular array. The shaft apertures 58 are circumferentially interspersed with the shaft teeth 60, and the shaft teeth 60 are circumferentially interspersed with the shaft apertures 58. Each shaft aperture 58 of FIG. 2, for example, is disposed between a circumferentially neighboring (e.g., adjacent) pair of the shaft teeth 60. Similarly, each shaft tooth 60 of FIG. 2 is disposed between a circumferentially neighboring pair of the shaft apertures 58. With this arrangement, the shaft teeth 60 may form the shaft apertures 58 in the engine shaft 30 and its shaft inner section 50.

Referring to FIG. 3, each shaft aperture 58 projects radially (in a radial inward direction towards the axis 28) into the engine shaft 30 and its shaft inner section 50 from the shaft outer surface 52 to a radial inner end 62 of the respective shaft aperture 58. Each shaft aperture 58 projects axially into the engine shaft 30 and its shaft inner section 50 from the shaft shelf 56 to an axial end 64 of the respective shaft aperture 58. Referring to FIG. 2, each shaft aperture 58 extends laterally within the engine shaft 30 and its shaft inner section 50 between opposing lateral sides 66 and 68 of the respective shaft aperture 58. Each shaft aperture 58 thereby has a lateral width 70 measured between the respective lateral sides 66 and 68/the respective circumferentially neighboring pair of the shaft teeth 60. Each shaft aperture 58 also has an axial length 72 measured between the shaft aperture end 64 and the shaft shelf 56. Referring again to FIG. 3, each shaft aperture 58 may have a substantially polygonal (e.g., rectangular) cross-sectional geometry when viewed, for example, in a reference plane parallel with (e.g., including) the axis 28.

Each shaft tooth 60 projects radially out to the shaft outer surface 52. Each shaft tooth 60 projects axially to the shaft shelf 56. Referring to FIG. 2, each shaft tooth 60 extends laterally between the lateral sides 66 and 68—here, opposing lateral sides of the respective shaft tooth 60.

Referring to FIG. 1, the shaft shoulder 40 is disposed axially between and separates the shaft outer section 48 and the shaft inner section 50 along the axis 28. The shaft shoulder 40 is connected to (e.g., formed integral with) the shaft base 38. The shaft shoulder 40 may be configured as an annular protrusion such as a flange or a rim. The shaft shoulder 40 of FIG. 1, for example, projects radially out from the shaft base 38 at its base outer side 44 to a distal radial outer side 74 of the shaft shoulder 40. At least a portion or an entirety of the shaft shoulder 40 along the shoulder outer side 74 may be threaded. The shaft shoulder 40 of FIG. 1, for example, includes an outer threaded region 76 at the shoulder outer side 74. The shaft shoulder 40 extends axially along the axis 28 between opposing axial sides 78 and 80 of the shaft shoulder 40.

The shaft shoulder 40 includes plurality of (e.g., annular) engagement surfaces 82 and 84; e.g., face surfaces, contact surfaces, etc. The shoulder first engagement surface 82 is disposed on the shoulder first side 78, for example axially adjacent (e.g., and contiguous with) an outer surface of the shaft outer section 48 at the base outer side 44. The shoulder second engagement surface 84 is disposed on the shoulder second side 80, for example axially adjacent (e.g., and contiguous with) the shaft outer surface 52 at the base outer side 44. The shoulder second engagement surface 84 is thereby arranged axially opposite the shoulder first engagement surface 82. The shaft shoulder 40 of FIG. 1 also includes a lubricant channel 86 and a plurality of internal lubricant passages 88.

The shoulder channel 86 is disposed at the shoulder first side 78, and may be radially adjacent the shaft base 38 and its shaft outer section 48. The shoulder channel 86 of FIG. 1, for example, projects axially along the axis 28 into the shaft shoulder 40 from the shoulder first engagement surface 82 to a distal axial end of the shoulder channel 86. The shoulder channel 86 extends radially within the engine shaft 30 between and to opposing radial sides of the shoulder channel 86. The channel inner side may be formed by the shaft base 38. The channel outer side is formed by the shaft shoulder 40. The shoulder channel 86 extends circumferentially about (e.g., completely around) the axis 28 within the engine shaft 30 and its shaft shoulder 40. The shoulder channel 86 may thereby have a full-hoop (e.g., annular) geometry.

The shoulder passages 88 are arranged circumferentially about the axis 28 in an array; e.g., a circular array. Each of the shoulder passages 88 is configured as a through-hole which extends axially through the engine shaft 30 and its shaft shoulder 40. Each shoulder passage 88 of FIG. 1, for example, extends axially (and slightly radially in a radial outward direction away from the axis 28 in FIG. 1) from an inlet 90 into the respective shoulder passage 88 to an outlet 92 from the respective shoulder passage 88. The shoulder passage inlet 90 is disposed at the shoulder second side 80, for example in the shoulder second engagement surface 84. The shoulder passage outlet 92 is disposed at (e.g., on, adjacent or proximate) the shoulder first side 78, for example in the shoulder channel axial end. The shoulder passages 88 are thereby fluidly coupled with the shoulder channel 86, and these elements 86 and 88 provide a lubricant flowpath axially across the shaft shoulder 40.

The engine shaft 30 is constructed from or otherwise includes non-ferromagnetic material. Examples of this non-ferromagnetic material include, but are not limited to, aluminum (Al), titanium (Ti), magnesium (Mg), nickel (Ni), or non-ferrous alloys thereof. The engine shaft 30 may be formed as a monolithic body. Herein, the term "monolithic" may describe a component which is formed as a single unitary body. The engine shaft 30 and its various features, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another. The present disclosure, however, is not limited to the foregoing exemplary manufacturing techniques. For example, it is contemplated the shaft teeth 60 and the shaft outer surface 52 may alternatively be formed by a (e.g., non-ferromagnetic) sleeve mounted onto the engine shaft 30.

The inner race 32 extends axially along the axis 28 between and to opposing axial sides 94 and 96 of the bearing 16 and its inner race 32. The inner race 32 extends radially from a radial inner side 98 of the bearing 16 and its inner race 32 to a radial outer side 100 of the inner race 32. The inner race 32 extends circumferentially about (e.g., completely around) the axis 28. The inner race 32 may thereby have a full-hoop (e.g., annular) geometry. The inner race 32 may include an (e.g., annular) outer groove 102, one or more inner lubricant channels 104 (one visible in FIG. 1) and one or more internal lubricant passages 106 (one visible in FIG. 1).

The race groove 102 is disposed at the inner race outer side 100. This race groove 102 projects radially (in a radial inward direction towards the axis 28) into the inner race 32 from the inner race outer side 100. The race groove 102 extends axially within the inner race 32 along the axis 28. The race groove 102 extends circumferentially about (e.g., completely around) the axis 28 within the inner race 32.

The race channels 104 are arranged circumferentially about the axis 28 in an array; e.g., a circular array. Each of the race channels 104 extends axially through the inner race 32 between and to the inner race first side 94 and the inner race second side 96. Each of the race channels 104 projects radially (in the radial outward direction) into the inner race 32 from the inner race inner side 98. Each of the race channels 104 extends laterally (e.g., circumferentially or tangentially) within the inner race 32 between opposing lateral sides of the respective race channel 104.

The race passages 106 are arranged circumferentially about the axis 28 in an array; e.g., a circular array. Each of the race passages 106 is configured as a through-hole which extends radially through the inner race 32. Each race passage 106 of FIG. 1, for example, extends radially from a respective one of the race channels 104 to the race groove 102. The race passages 106 may thereby fluidly couple the race channels 104 to the race groove 102.

The bearing 16 may be configured as a rolling element bearing. The bearing 16 of FIG. 1, for example, also includes an outer race 108 and a plurality of rolling elements 110 (one visible in FIG. 1) arranged circumferentially about the axis 28 and the inner race 32 in an array; e.g., a circular array. Briefly, the outer race 108 is fixedly mounted to the stationary structure 12 and circumscribes the inner race 32 as well as an array of the rolling elements 110. The rolling elements 110 may be configured as ball bearing elements or alternatively roller bearing elements. Each rolling element 110 of FIG. 1 is seated within the race groove 102 of the inner race 32. Each rolling element 110 is disposed radially between and engages (e.g., contacts, rolls along, etc.) the inner race 32 and the outer race 108.

The inner race 32 may be axially retained and rotatably fixed to the engine shaft 30 in a stack along the shaft outer section 48. The bearing 16 and its inner race 32, for example, are mounted on the engine shaft 30 and its shaft outer section 48 axially adjacent the shaft shoulder 40. The inner race second side 96 of FIG. 1, for example, axially engages (e.g., is abutted axially against, contacts, etc.) the shoulder first engagement surface 82. With this arrangement, the race channels 104 are fluidly coupled to the shoulder passages 88 through the shoulder channel 86. The inner race 32 may be preloaded between the shaft shoulder 40 and another engine component 112; e.g., a seal land, a stack nut, a spacer, etc. This preload is selected to clamp (e.g., grip, squeeze, etc.) the inner race 32 between the shaft shoulder 40 and the other engine component 112, and thereby fixing the inner race 32 to the engine shaft 30.

Figure 4:
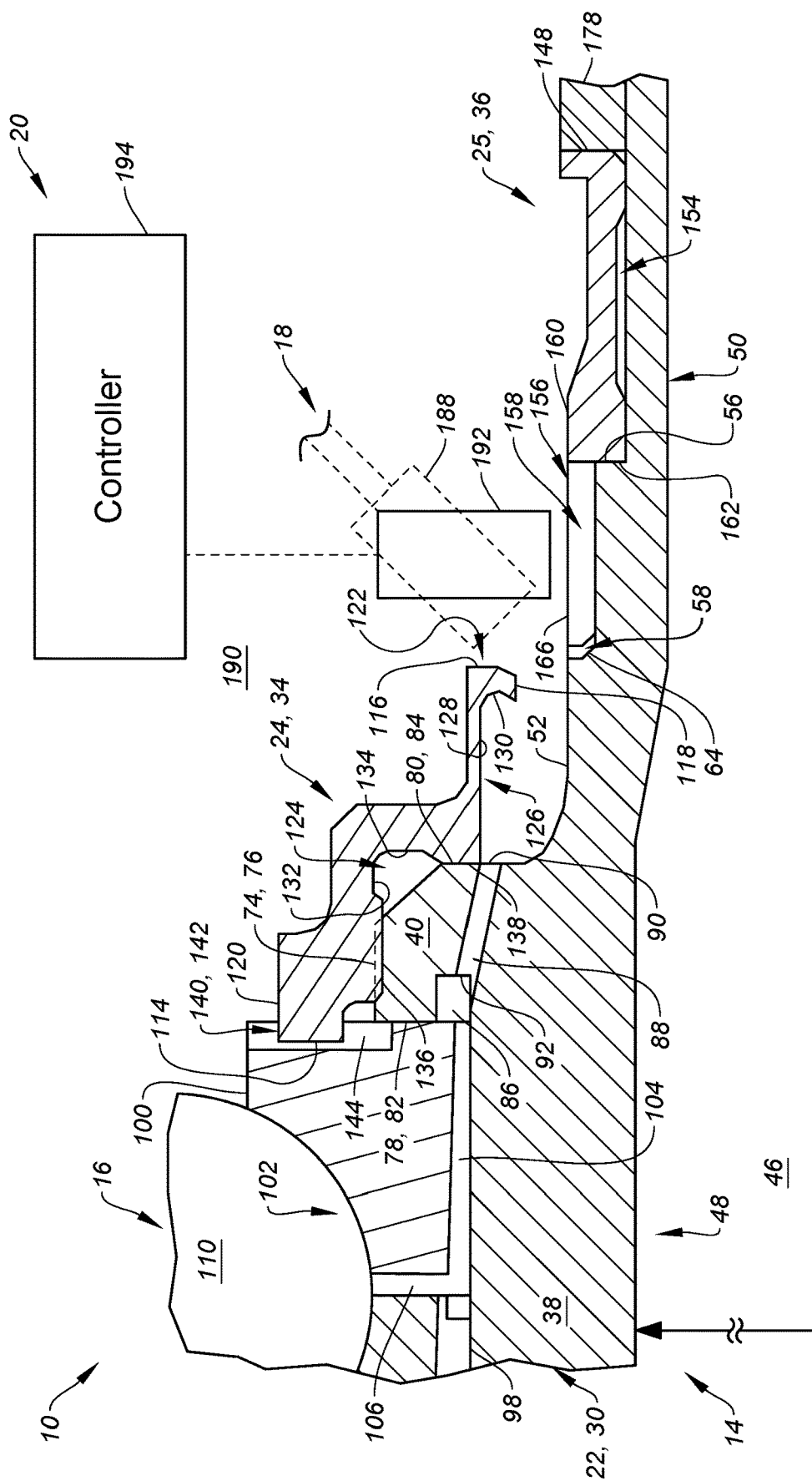
FIG. 4 is a partial side sectional illustration of the engine assembly at a phonic wheel and a lubricant scoop.

Referring to FIG. 4, the scoop body 34 extends axially along the axis 28 between and to opposing axial sides 114 and 116 of the scoop body 34. The scoop body 34 extends radially from a radial inner side 118 of the scoop body 34 to a radial outer side 120 of the scoop body 34. The scoop body 34 extends circumferentially about (e.g., completely around) the axis 28. The scoop body 34 may thereby have a full-hoop (e.g., annular) geometry. The scoop body 34 includes a (e.g., axial) lubricant scoop 122 and a counterbore 124.

The lubricant scoop 122 is configured to collect lubricant (e.g., engine oil) at the body second side 116 and/or the body inner side 118. The lubricant scoop 122 of FIG. 4, for example, includes a lubricant gutter 126. This gutter 126 projects radially (in the radial outward direction) into the scoop body 34 from the body inner side 118 to a distal radial outer side 128 of the gutter 126. The gutter 126 projects axially into the scoop body 34 to a distal axial end 130 of the gutter 126. The gutter 126 extends circumferentially about (e.g., completely around) the axis 28 within the scoop body 34. The gutter 126 may thereby have a full-hoop (e.g., annular) geometry.

The counterbore 124 is disposed at (or about) the body first side 114. The counterbore 124 projects radially (in the radial outward direction) into the scoop body 34 from the gutter outer side 128 to a radial outer side 132 of the counterbore 124. The counterbore 124 projects axially into the scoop body 34 to an axial end 134 of the counterbore 124. The counterbore 124 extends circumferentially about (e.g., completely around) the axis 28 within the scoop body 34. The counterbore 124 may thereby have a full-hoop (e.g., annular) geometry. Within this counterbore 124, the scoop body 34 of FIG. 4 includes an inner threaded region 136 and an (e.g., annular) engagement surface 138; e.g., a face surface, a contact surface, etc. The inner threaded region 136 is disposed at (or about) the counterbore outer side 132. The body engagement surface 138 is disposed at (or about) the counterbore axial end 134.

The scoop body 34 is mounted onto and fixedly attached to the engine shaft 30. The scoop body 34 of FIG. 4, for example, is threaded onto the engine shaft 30 and its shaft shoulder 40, where the inner threaded region 136 is mated with (e.g., threaded onto) the outer threaded region 76. The body engagement surface 138 axially engages (e.g., is abutted axially against, contacts, etc.) the shoulder second engagement surface 84. The scoop body 34 may also be torqued to provide a preload between the scoop body 34 and the shaft shoulder 40. With this arrangement, the scoop body 34 axially engages the engine shaft 30 and its shaft shoulder 40 at a discrete (e.g., radially inward) location from the threaded interface radially between the scoop body 34 and the shaft shoulder 40. Moreover, an axial side of the gutter 126 may also be formed by the shaft shoulder 40 and its shoulder second engagement surface 84. The gutter 126 is fluidly coupled with the shoulder passages 88 through their shoulder passage inlets 90.

While the scoop body 34 axially engages and may be preloaded against the engine shaft 30 and its shaft shoulder 40, the scoop body 34 may be axially disengaged from (e.g., may be axially separated from) the bearing 16 and its inner race 32. The scoop body 34 therefore is structurally outside of the stack of the engine components 32 and 112 (see FIG. 1). However, it is contemplated the scoop body 34 may contact the bearing 16 and its inner race 32. An anti-rotation feature 140, for example, may be provided between the scoop body 34 and the inner race 32. The anti-rotation feature 140 of FIG. 4 includes a plurality of anti-rotation tabs 142 (one visible in FIG. 4) arranged circumferentially about the axis 28 in an array (e.g., a circular array) at the body first side 114. The scoop body 34 may thereby have a castellated rim at the body first side 114. Each of the tabs 142 may project axially partially into a respective recess 144 in the inner race 32. The anti-rotation feature 140 and its tabs 142 may thereby rotationally lock (e.g., fix) the scoop body 34 to the bearing 16 and its inner race 32 without transferring axial loads between the inner race 32 and the scoop body 34. With such an arrangement, the scoop body 34 may be mounted to the engine shaft 30 before the inner race 32. Of course, it is contemplated other techniques may also or alternatively be used for rotationally fixing (e.g., preventing backing off of) the scoop body 34.

Figure 5:
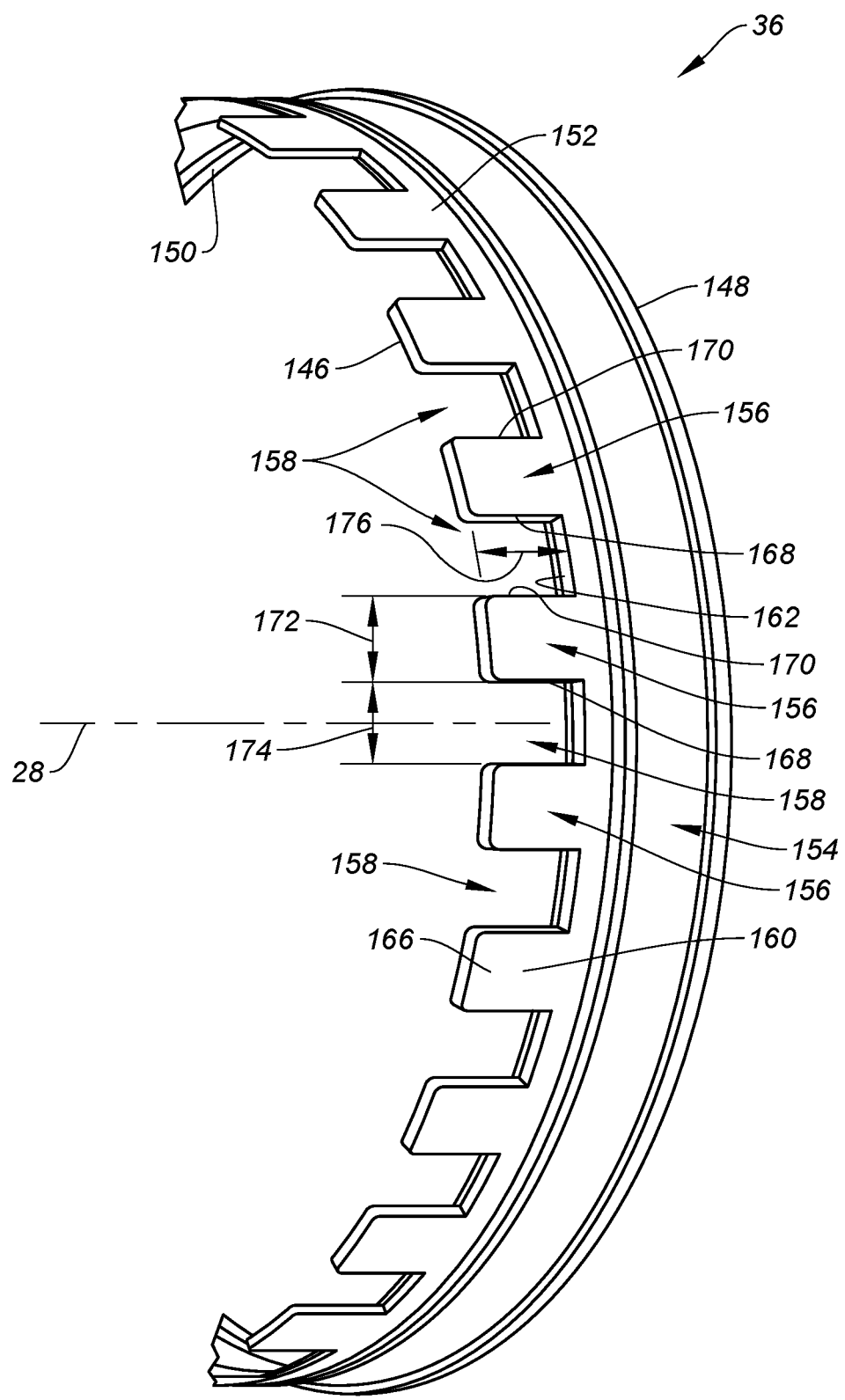
FIG. 5 is a partial perspective illustration of the phonic wheel.

Referring to FIG. 5, the phonic wheel 36 extends axially along the axis 28 between and to opposing axial sides 146 and 148 of the phonic wheel 36. The phonic wheel 36 extends radially from a radial inner side 150 of the phonic wheel 36 to a radial outer side 152 of the phonic wheel 36. The phonic wheel 36 extends circumferentially about (e.g., completely around) the axis 28. The phonic wheel 36 may thereby have a full-hoop (e.g., annular) geometry. The phonic wheel 36 includes a base 154, a plurality of teeth 156 (e.g., castellations, tabs, protrusions, etc.) and a plurality of apertures 158 (e.g., slots, grooves, etc.).

Figure 6:
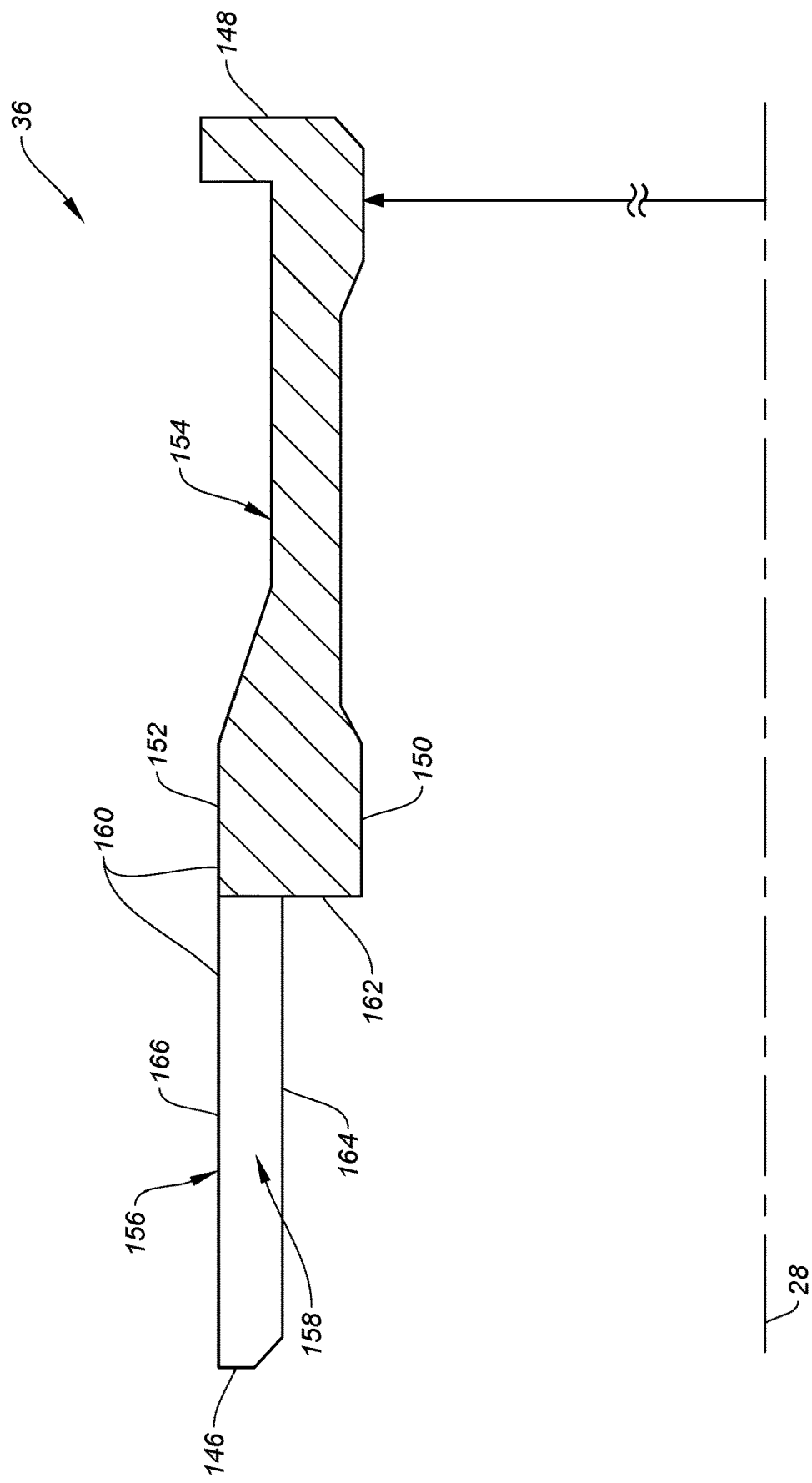
FIG. 6 is a partial side sectional illustration of the phonic wheel.

Referring to FIG. 6, the wheel base 154 extends radially from the wheel inner side 150 to an outer surface 160 of the phonic wheel 36 at the wheel outer side 152. The wheel base 154 extends axially along the axis 28 from the wheel second side 148 to a (e.g., partially castellated) shelf 162 of the phonic wheel 36 axially at an interface between the wheel base 154 and the wheel teeth 156. The wheel base 154 extends circumferentially about (e.g., completely around) the axis 28.

Referring to FIG. 5, the wheel teeth 156 are arranged circumferentially about the axis 28 in an array; e.g., a circular array. The wheel apertures 158 are similarly arranged circumferentially about the axis 28 in an array; e.g., a circular array. The wheel teeth 156 are circumferentially interspersed with the wheel apertures 158, and the wheel apertures 158 are circumferentially interspersed with the wheel teeth 156. Each wheel tooth 156 of FIG. 5, for example, is disposed between a circumferentially neighboring (e.g., adjacent) pair of the wheel apertures 158. Similarly, each wheel aperture 158 of FIG. 5 is disposed between a circumferentially neighboring pair of the wheel teeth 156.

With this arrangement, the wheel teeth 156 may form the wheel apertures 158 in the phonic wheel 36.

Referring to FIG. 6, each wheel tooth 156 is connected to (e.g., formed integral with) the wheel base 154. Each wheel tooth 156 projects axially along the axis 28 out from the wheel base 154 and the wheel shelf 162 to an (e.g., unsupported) axial end of the respective wheel tooth 156 at the wheel first side 146. Each wheel tooth 156 extends radially from a radial inner surface 164 of the respective tooth to a radial outer surface 166 of the respective tooth, which tooth outer surface 166 may be/form a respective portion of the wheel outer surface 160. The tooth inner surface 164 is stepped radially outboard from the wheel inner side 150. An annular portion of the wheel shelf 162, for example, extends radially between and to the wheel inner side 150 and each tooth inner surface 164.

Referring to FIG. 5, each wheel tooth 156 extends laterally between opposing lateral sides 168 and 170 of the respective wheel tooth 156. Each wheel tooth 156 thereby has a lateral width 172 measured between the respective lateral sides 168 and 170/the circumferentially neighboring pair of the wheel apertures 158. This width 172 may be sized within five or ten percent (5-10%), or less, of (or substantially equal to) the width 70 of a respective shaft aperture 58 (see FIG. 2). The width 172 of each wheel tooth 156, for example, may be sized between ninety percent (90%) and (e.g., just under) one-hundred percent (100%) of the width 70 of a respective shaft aperture 58 (see FIG. 2). The width 172 of each wheel tooth 156 may also be sized equal to or less than a lateral distance 174 between each circumferentially neighboring pair of the wheel teeth 156. Each wheel tooth 156 also has an axial length 176 measured between the wheel first side 146 and the wheel shelf 162. This length 176 may similarly be sized within five, ten or fifteen percent (5, 10, 15%), or less, of (or substantially equal to) the length 72 of a respective shaft aperture 58 (see FIG. 2).

Referring to FIG. 6, each wheel tooth 156 may have a substantially polygonal (e.g., rectangular with or without a chambered inner edge) cross-sectional geometry when viewed, for example, in a reference plane parallel with (e.g., including) the axis 28. This tooth cross-sectional geometry may be similar to or match the cross-sectional geometry of a respective shaft aperture 58; e.g., see FIG. 4.

Each wheel aperture 158 of FIG. 6 projects axially into the phonic wheel 36 from the wheel first side 146 to the wheel shelf 162. Each wheel aperture 158 extends radially through the phonic wheel 36 from the respective tooth inner surfaces 164 to the respective tooth outer surfaces 166/the wheel outer surface 160. Referring to FIG. 5, each wheel aperture 158 extends laterally within the phonic wheel 36 between and to the respective circumferentially neighboring pair of the wheel teeth 156.

With the foregoing arrangement, the wheel outer surface 160 of FIG. 5 is formed by the wheel base 154 and the wheel teeth 156. The wheel outer surface 160 is a radial outward facing surface. This wheel outer surface 160 extends axially along the axis 28 to the wheel first side 146. The wheel outer surface 160 extends circumferentially about (e.g., completely around) the axis 28. The wheel outer surface 160 may thereby have a full-hoop geometry. The wheel outer surface 160 of FIG. 5, for example, is configured as a (e.g., partially castellated) cylindrical surface.

The phonic wheel 36 is constructed from or otherwise includes ferromagnetic material. Examples of this ferromagnetic material include, but are not limited to, iron (Fe), nickel (Ni), cobalt (co) or alloys thereof such as stainless steel. The phonic wheel 36 may be formed as a monolithic body. Again, the term "monolithic" may describe a component which is formed as a single unitary body. The phonic wheel 36 and its various features, for example, may be additively manufactured, cast, machined and/or otherwise formed as an integral, unitary body. By contrast, a non-monolithic body may include parts that are discretely formed from one another, where those parts are subsequently mechanically fastened and/or otherwise attached to one another. The present disclosure, however, is not limited to the foregoing exemplary manufacturing techniques. Moreover, in other embodiments, the phonic wheel 36 may be constructed from or otherwise include the non-ferromagnetic material, and the engine shaft 30 may be constructed from or otherwise include the ferromagnetic material.

Figure 7:
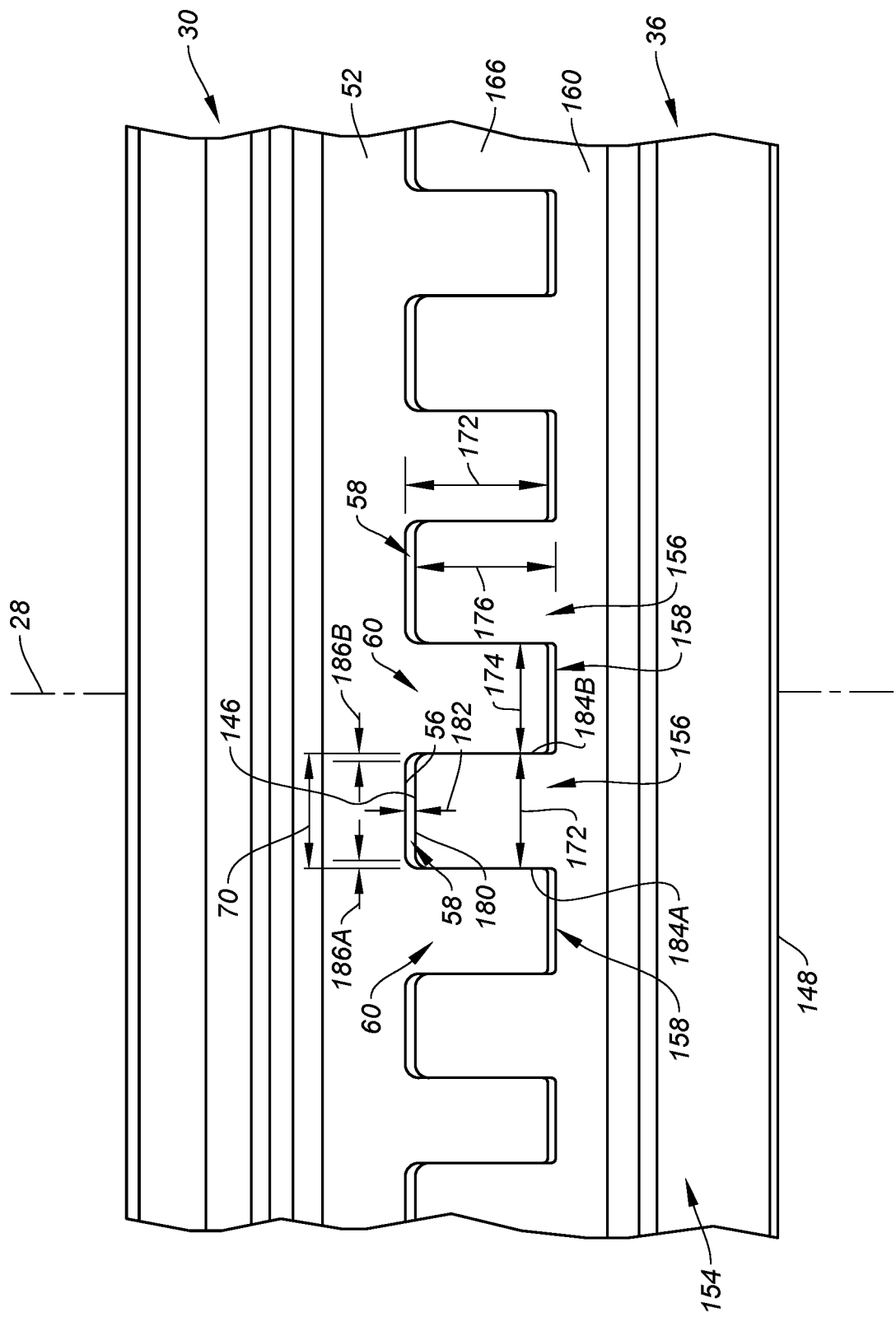
FIG. 7 is a partial side sectional illustration of the engine assembly at a meshed interface between the engine shaft and the phonic wheel.

Referring to FIG. 4, the phonic wheel 36 is mounted on the engine shaft 30 and its shaft inner section 50. The wheel base 154 and the wheel shelf 162 of FIG. 4, for example, axially engage (e.g., are abutted axially against, contact, etc.) the shaft inner section 50 and its shaft shelf 56. Referring to FIG. 7, each wheel tooth 156 is mated with a respective one of the shaft aperture 58. Each wheel tooth 156 of FIG. 7, for example, projects axially into the respective shaft aperture 58. Similarly, each shaft tooth 60 is mated with a respective one of the wheel apertures 158. Each shaft tooth 60 of FIG. 7, for example, projects axially into the respective wheel aperture 158. The wheel teeth 156 may thereby be meshed with/circumferentially interspersed with the shaft teeth 60. Referring again to FIG. 4, the phonic wheel 36 may be preloaded between the engine shaft 30 and its shaft shelf 56 and another engine component 178; e.g., another stack nut, a spacer, a seal land, etc. This preload is selected to clamp (e.g., grip, squeeze, etc.) the phonic wheel 36 between the engine shaft 30 and the other engine component 178, and thereby fixing the phonic wheel 36 to the engine shaft 30.

The wheel outer surface 160 may be radially flush (e.g., radially aligned) with the shaft outer surface 52. Referring to FIG. 7, each wheel tooth 156 is axially spaced from the engine shaft 30 and its shaft shelf 56 by an axial gap 180; e.g., an open volume. An axial width 182 of this axial gap 180, measured axially between a distal axial end of a respective wheel tooth 156 (e.g., the wheel first side 146) and the shaft shelf 56, may be sized less than five or ten percent (5-10%), or less, of (or substantially equal to) the length 176 of respective wheel tooth 156 and/or the length 72 of respective shaft aperture 58. Each wheel tooth 156 is also laterally spaced from the engine shaft 30 and a respective adjacent shaft tooth 60 a lateral gap 184A, 184B (generally referred to as "184"); e.g., an open volume. A lateral width 186A, 186B (generally referred to as "186") of this lateral gap 184A, 184B, measured lateral between the adjacent teeth 60 and 156 and their respective lateral sides, may be sized less than five or ten percent (5-10%), or less, of (or substantially equal to) the width 172 of respective wheel tooth 156 and/or the width 70 of respective shaft aperture 58. By filling in the wheel apertures 158 and providing the relatively small gaps 180 and 184 between the engine shaft 30 and the phonic wheel 36, flow disruptions caused by rotation of the phonic wheel 36 may be reduced. For example, by configuring the wheel teeth 156 of FIG. 4 flush with the shaft outer surface 52, the lateral sides of the wheel teeth 156 are substantially hidden and thereby do not move (e.g., push) significant amounts of air within a bearing compartment 190 for the bearing 16. The phonic wheel 36 therefore may be positioned relatively close to the lubricant scoop 122 without (e.g., significantly) adversely significantly affecting lubricant collection.

With the foregoing arrangement, the scoop body 34 and its lubricant scoop 122 may be positioned axially adjacent the phonic wheel 36 and its wheel teeth 156. The scoop body 34 of FIG. 4 and its lubricant scoop 122, for example, are disposed radially outboard of and axially overlap the shaft outer surface 52. Moreover, the gutter 126 is disposed radially outboard of/radially opposite of the shaft outer surface 52 axially adjacent the phonic wheel 36. The body second side 116, however, may be axially offset from the wheel teeth 156 such that the scoop body 34 and its lubricant scoop 122 may not axially overlap the phonic wheel 36 and its wheel teeth 156.

The lubrication system 18 is configured to deliver lubricant (e.g., engine oil) to at least (or only) the bearing 16; see also FIG. 1. The lubrication system 18 of FIG. 4, for example, includes the lubricant elements 86, 88, 104, 106, 122 and 126 and a lubricant injector 188 (e.g., a nozzle), which lubricant injector 188 is shown in dashed line form to indicate it is located at another circumferential location about the axis 28. The lubricant injector 188 of FIG. 4 is configured to direct (e.g., inject) the lubricant into the bearing compartment 190 towards the lubricant scoop 122. This lubricant may be collected in the gutter 126 and directed to the bearing 16 and its inner race 32 through the shoulder passages 88 and the shoulder channel 86. More particularly, the shoulder channel 86 may distribute the lubricant to the race channels 104. Each race channel 104 may direct at least some of that lubricant to the rolling elements 110 through the race passage 106.

The sensor system 20 is configured to measure at least one parameter of the rotating assembly 14. The sensor system 20 of FIG. 4, for example, includes the phonic wheel 36, a speed sensor 192 and a controller 194. The speed sensor 192 may be a magnetic pickup probe. A tip of the speed sensor 192 is disposed radially outboard of and adjacent the phonic wheel 36 and its wheel teeth 156. The speed sensor 192 is configured to measure fluctuations in a magnetic field which are induced by the phonic wheel 36 and its wheel teeth 156 during rotation of the rotating assembly 14. The speed sensor 192, for example, may output a voltage signal (e.g., a series of electric pulses) indicative of when each wheel tooth 156 (or wheel aperture 158) passes the tip of the speed sensor 192. The controller 194 receives the voltage signal and may process the voltage signal to determine a rotational velocity that the phonic wheel 36 and its wheel teeth 156 and, thus, the rotating assembly 14 and its engine shaft 30 are rotating about the axis 28. Of course, the controller 194 may also or alternatively process the voltage signal to determine various other engine parameters such as, but not limited to, shaft torque and the like.

In some embodiments, the scoop body 34 may be mounted onto and fixedly attached to the engine shaft 30 as described above. In other embodiments, however, it is contemplated the scoop body 34 may alternatively be integrated as a part of the engine shaft 30 or another component attached to the engine shaft 30.

Figure 8:
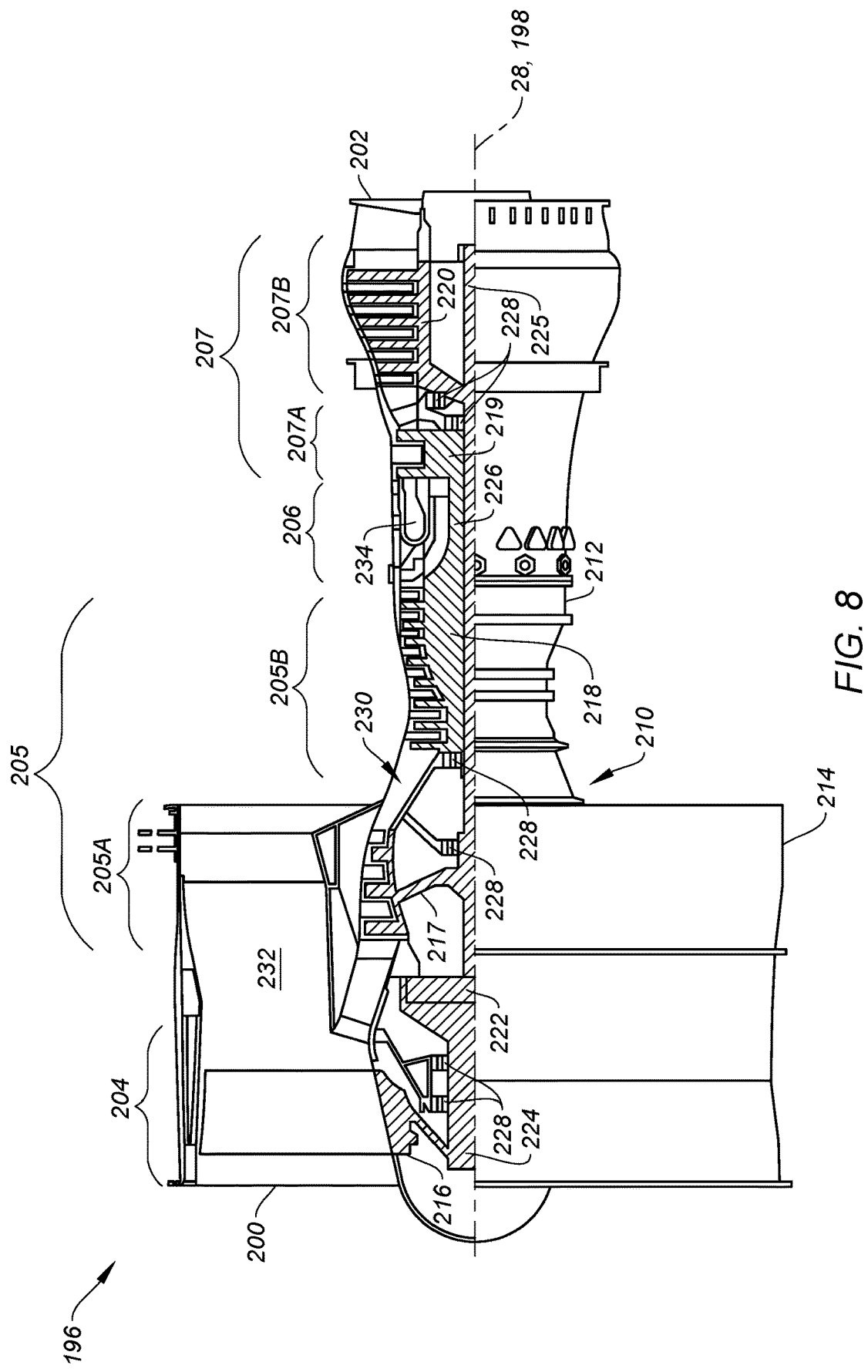
FIG. 8 is a side cutaway illustration of a gas turbine engine.

FIG. 8 illustrates an example of the turbine engine which may include the engine assembly 10. This turbine engine is configured as a turbofan gas turbine engine 196. The turbine engine 196 of FIG. 8 extends along an axial centerline 198 (e.g., the axis 28) between an upstream airflow inlet 200 and a downstream combustion products exhaust 202. The turbine engine 196 includes a fan section 204, a compressor section 205, a combustor section 206 and a turbine section 207. The compressor section 205 includes a low pressure compressor (LPC) section 205A and a high pressure compressor (HPC) section 205B. The turbine section 207 includes a high pressure turbine (HPT) section 207A and a low pressure turbine (LPT) section 207B.

The engine sections 204-207B are arranged sequentially along the axial centerline 198 within an engine housing 210. This engine housing 210 includes an inner case 212 (e.g., a core case) and an outer case 214 (e.g., a fan case). The inner case 212 may house one or more of the engine sections 205A-207B; e.g., a core of the turbine engine 196. The outer case 214 may house at least the fan section 204. The stationary structure 12 of FIG. 1 may be connected to or configured as part of the engine housing 210.

Each of the engine sections 204, 205A, 205B, 207A and 207B includes a respective bladed rotor 216-220. Each of these bladed rotors 216-220 includes a plurality of rotor blades arranged circumferentially around and connected to one or more respective rotor disks. The rotor blades, for example, may be formed integral with or mechanically fastened, welded, brazed and/or otherwise attached to the respective rotor disk(s).

The fan rotor 216 is connected to a geartrain 222, for example, through a fan shaft 224. The geartrain 222 and the LPC rotor 217 are connected to and driven by the LPT rotor 220 through a low speed shaft 225. The HPC rotor 218 is connected to and driven by the HPT rotor 219 through a high speed shaft 226. The engine shafts 224-226 are rotatably supported by a plurality of bearings 228; e.g., rolling element and/or thrust bearings. Each of these bearings 228 is connected to the engine housing 210 by at least one stationary structure. The bearing 16 of FIG. 1 may be configured as any one of these bearings 228, and the engine shaft 30 of FIG. 1 may be configured as any one of the engine shafts 224-226.

During operation, air enters the turbine engine 196 through the airflow inlet 200. This air is directed through the fan section 204 and into a core flowpath 230 and a bypass flowpath 232. The core flowpath 230 extends sequentially through the engine sections 205A-207B. The air within the core flowpath 230 may be referred to as "core air". The bypass flowpath 232 extends through a bypass duct, which bypasses the engine core. The air within the bypass flowpath 232 may be referred to as "bypass air".

The core air is compressed by the LPC rotor 217 and the HPC rotor 218 and directed into a combustion chamber 234 of a combustor in the combustor section 206. Fuel is injected into the combustion chamber 234 and mixed with the compressed core air to provide a fuel-air mixture. This fuel-air mixture is ignited and combustion products thereof flow through and sequentially cause the HPT rotor 219 and the LPT rotor 220 to rotate. The rotation of the HPT rotor 219 and the LPT rotor 220 respectively drive rotation of the HPC rotor 218 and the LPC rotor 217 and, thus, compression of the air received from a core airflow inlet. The rotation of the LPT rotor 220 also drives rotation of the fan rotor 216, where the rotation of the fan rotor 216 propels the bypass air through and out of the bypass flowpath 232. The propulsion of the bypass air may account for a majority of thrust generated by the turbine engine 196.

The engine assembly 10 may be included in various turbine engines other than the one described above. The engine assembly 10, for example, may be included in a geared turbine engine where a geartrain connects one or more shafts to one or more rotors in a fan section, a compressor section and/or any other engine section. Alternatively, the engine assembly 10 may be included in a turbine engine configured without a geartrain; e.g., a direct drive turbine engine. The engine assembly 10 may be included in a turbine engine with a single spool, with two spools (e.g., see FIG. 8), or with more than two spools. The turbine engine may be configured as a turbofan engine, a turbojet engine, a turboprop engine, a turboshaft engine, a propfan engine, a pusher fan engine or any other type of turbine engine. The turbine engine may alternatively be configured as an auxiliary power unit (APU) or an industrial gas turbine engine. The present disclosure therefore is not limited to any particular types or configurations of turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:
    a rotating assembly configured to rotate about an axis, the rotating assembly including an engine component and a phonic wheel;
    the engine component comprising a first material and a plurality of apertures arranged circumferentially about the axis; and
    the phonic wheel comprising a second material and a plurality of teeth arranged circumferentially about the axis, each of the plurality of teeth projecting axially into a respective one of the plurality of apertures;
    one of the first material and the second material comprising non-ferromagnetic material, and another one of the first material and the second material comprising ferromagnetic material; and
    wherein the engine component is configured as an engine shaft.

2. The assembly of claim 1, further comprising a sensor configured to measure fluctuations in a magnetic field induced by the plurality of teeth during rotation of the rotating assembly about the axis.

3. The assembly of claim 2, further comprising:
    a sensor system comprising the phonic wheel and the sensor;
    the sensor system configured to determine a rotational velocity of the rotating assembly.

4. The assembly of claim 2, wherein a tip of the sensor is disposed radially outboard of and adjacent the plurality of teeth.

5. The assembly of claim 1, wherein the phonic wheel is mounted on the engine component.

6. The assembly of claim 1, wherein
    the phonic wheel further comprises a base;
    each of the plurality of teeth project axially out from a first side of the base; and
    the first side of the base axially engages the engine component.

7. The assembly of claim 1, wherein
    the plurality of apertures comprise a first aperture with a lateral aperture width;
    the plurality of teeth comprise a first tooth with a lateral tooth width; and
    the lateral tooth width is within ten percent of the lateral aperture width.

8. The assembly of claim 1, wherein
    the plurality of teeth comprise a first tooth with a lateral tooth width;
    the first tooth is laterally separated from the engine component by a gap with a lateral gap width less than ten percent of the lateral tooth width.

9. The assembly of claim 1, wherein
    the plurality of teeth comprise a first tooth with an axial tooth length;
    the first tooth is axially separated from the engine component by a gap with an axial gap width less than ten percent of the axial tooth length.

10. The assembly of claim 1, wherein
    each of the plurality of teeth has a lateral width; and
    each circumferentially neighboring pair of the plurality of teeth are spaced apart by a lateral distance that is equal to or greater than the lateral width.

11. The assembly of claim 1, wherein
    the engine component further comprises a component outer surface, and each of the plurality of apertures projects radially into the engine component from the component outer surface; and
    the plurality of teeth comprise a first tooth with a tooth outer surface which is radially flush with the component outer surface.

12. The assembly of claim 11, wherein
    the rotating assembly further includes a lubricant scoop radially outboard of and axially overlapping the component outer surface; and
    a lubricant collection area is formed by and radially between the engine component and the lubricant scoop.

13. The assembly of claim 1, wherein
    the rotating assembly further includes a lubricant scoop;
    the lubricant scoop is radially outboard of and axially overlaps the engine component, and the lubricant scoop is axially adjacent the phonic wheel; and
    a lubricant collection area is formed by and radially between the engine component and the lubricant scoop.

14. The assembly of claim 1, further comprising a bearing rotatably supporting the rotating assembly.

15. The assembly of claim 1, wherein the rotating assembly further comprises a bladed rotor connected to the engine component.

16. An assembly for a turbine engine, comprising:
    a rotating assembly configured to rotate about an axis, the rotating assembly including an engine component and a phonic wheel;
    the engine component comprising non-ferromagnetic material and a plurality of component teeth arranged circumferentially about the axis; and
    the phonic wheel comprising ferromagnetic material and a plurality of wheel teeth arranged circumferentially about the axis, the plurality of wheel teeth meshed with the plurality of component teeth; and
    a sensor configured to measure fluctuations in a magnetic field induced by the plurality of wheel teeth during rotation of the rotating assembly about the axis; and
    wherein the engine component is configured as an engine shaft.

* * * * *